United States Patent [19]

Woodling

[11] Patent Number: 5,222,348
[45] Date of Patent: Jun. 29, 1993

[54] BICYCLE POWERED MOWER

[76] Inventor: David R. Woodling, P.O. Box 871, Cedar Crest, N. Mex. 87008-0871

[21] Appl. No.: 771,338

[22] Filed: Oct. 4, 1991

[51] Int. Cl.⁵ .................. B62K 13/00; A01D 34/56
[52] U.S. Cl. .............................. 56/2; 56/249; 280/7.1
[58] Field of Search .............. 56/2, 249; 280/7.1, 280/7.15, 212, 296

[56] References Cited

U.S. PATENT DOCUMENTS

| | | | |
|---|---|---|---|
| 613,834 | 11/1898 | Burnet | 56/249 X |
| 1,713,396 | 5/1929 | Rountree | 56/249 X |
| 3,630,010 | 12/1971 | Rester | 56/13.5 |
| 3,947,912 | 4/1976 | Michaels | 56/400.02 X |
| 4,341,058 | 7/1982 | Chun | 56/2 |
| 4,555,816 | 6/1984 | Porath | 56/2 X |

FOREIGN PATENT DOCUMENTS

2468474  5/1981  France ................... 280/7.1

Primary Examiner—David J. Bagnell
Attorney, Agent, or Firm—Ladas & Parry

[57] ABSTRACT

A bicycle powered lawn mower comprises a mower frame, to which is attached a rear axle carrying a pair of rear wheels. The mower frame includes bicycle support brackets whereby a bicycle can be releasably received on the frame. A drive is provided whereby the mower frame can be transported over a surface. The mower frame further comprises a cutter blade assembly operatively connected to the drive so that the blade assembly can be selectively activated or deactivated.

19 Claims, 5 Drawing Sheets

BICYCLE POWERED MOWER

FIELD AND BACKGROUND OF THE INVENTION

This invention relates to bicycle powered mower apparatus. More particularly, the invention relates to mower apparatus adapted to receive and be powered by a conventional bicycle.

Pedal operated lawn mowers are known in the art. For example, U.S. Pat. No. 4,455,816 (Porath) describes a tricycle frame which provides basic support for the pedal operated mower. Porath recites a tricycle frame having a front wheel and a pair of rear wheels with the mower cutting blades located between the rear wheels. A chain extends between a pedal sprocket and a rear axle sprocket, and pedaling the bicycle results in rotation of the blade as well as the wheels. The mower of Porath is a composite unit with a bicycle and mower integrated into a single entity.

U.S. Pat. No. 4,341,058 (Chun) describes a pedal powered bicycle mower apparatus including a mainframe and a centrally positioned cutting apparatus mounted on the frame. The cutting apparatus is driven by a series of gears which translate force from the pedals into rotational movement of a cutting blade about a vertical axis to the longitudinal axis of the main supporting frame. Chun describes a bicycle mower apparatus which also comprises a single unit with the mower apparatus forming an integral part of the bicycle.

U.S. Pat. No. 3,630,010 (Rester) describes a multiple use mini-bike for road or trail, having lawn and soil treating and cutting attachments. The Rester device is a motorized vehicle, with the drive motor 22 being secured to the frame. The mini-bike includes a motor 64 which can be attached to the bike and drive motor by means of a flexible coupling 78. The mower 64 is power driven by the motor 22 and there is no connection and operation between the movement of the blade of the mower and rotation of the wheels of the mini-bike.

SUMMARY OF THE INVENTION

The present invention provides a bicycle powered mower apparatus, the mower apparatus being releasably attachable to a conventional bicycle, wherein the mower blades are driven by rotation of one of the wheels of the bicycle, or the sprocket wheel.

According to one aspect of the invention, there is provided a bicycle powered mower comprising: a mower frame; a pair of rear wheels mounted on an axle near the rear of the mower frame; bicycle support means on the mower frame for releasably receiving a bicycle having a frame, front wheel, rear wheel, and front fork; drive means for driving the mower frame over a surface; and a cutter blade assembly operatively connected to the drive means for selectively activating the cutter blade assembly.

Preferably, the mower frame is substantially rectangular and further comprises a pair of front wheels, which may be operated by a steering mechanism to permit steering of the mower frame. The steering mechanism may include a bracket for connection to the front fork of a bicycle so that the front wheels can be steered by steering the bicycle.

The bicycle support means may comprise a ball pivot support bracket for supporting the frame of the bicycle and a steering support bracket for connection to the front fork of the bicycle.

Preferably, the drive assembly comprises a main drive roller for supporting and remaining in fixed contact with the rear wheel of the bicycle and a transmission assembly between the main drive roller and the rear wheels for transmitting motive force from the main drive roller to the rear wheels to drive the mower frame. The transmission assembly may comprise a first gear train between the drive roller and the rear wheels to drive the mower frame in a reverse direction and a second gear train between the drive roller and the rear wheels to drive the mower frame in a forward direction. Preferably, the first and second gear trains include first and second drive sprockets respectively, each drive sprocket being mounted on the rear wheel axle.

The first gear train may comprise a series of sprockets and chains between the drive roller and the rear axle, and the second gear train comprises a series of sprockets and chains between the first gear train and the rear axle.

Each drive sprocket preferably has associated connecting means fixed to the axle to which the drive sprocket can be releasably connected, the drive sprocket being movable between a first position wherein the sprocket is connected to its associated connecting means and thereby rotates the axle when driven, and a second position wherein the drive sprocket is disconnected from its associated connected means and, when rotated, rotates freely about the axle, the drive sprocket being normally biased into the second position. The connecting means may comprise a fixed member attached to the rear axle, a drive pin extending outwardly from the fixed member and a drive pin receiving hole in the drive sprocket for receiving the drive pin when the drive sprocket is in the first position. Conveniently, control means for moving the drive sprocket between the first and second positions are provided, the control means including a pivotal lever one end of which is adjacent the drive sprocket, the other end of which can be operated to move the drive sprocket between the first and second positions.

Preferably, the cutter blade assembly comprises a rotatable blade member mounted to the frame by a bracket, a fixed blade and height adjustment means. The cutter blade assembly may be driven by a chain/sprocket system with a clutch mechanism. The cutter assembly may also comprise a lift cable whereby the blade member can be raised and lowered, wherein raising the blade member reduces the distance between the blade member and the drive means and causes slack in the belt.

DETAILED DESCRIPTION OF THE PREFERRED EMBODIMENTS

Figure 1:
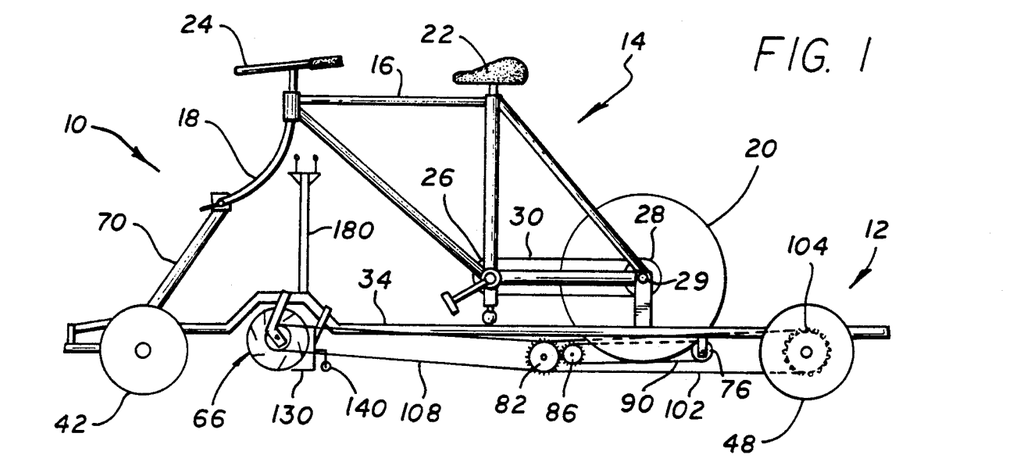
FIG. 1 is a side view of a first embodiment of a bicycle powered lawn mower of the present invention.
Figure 2:
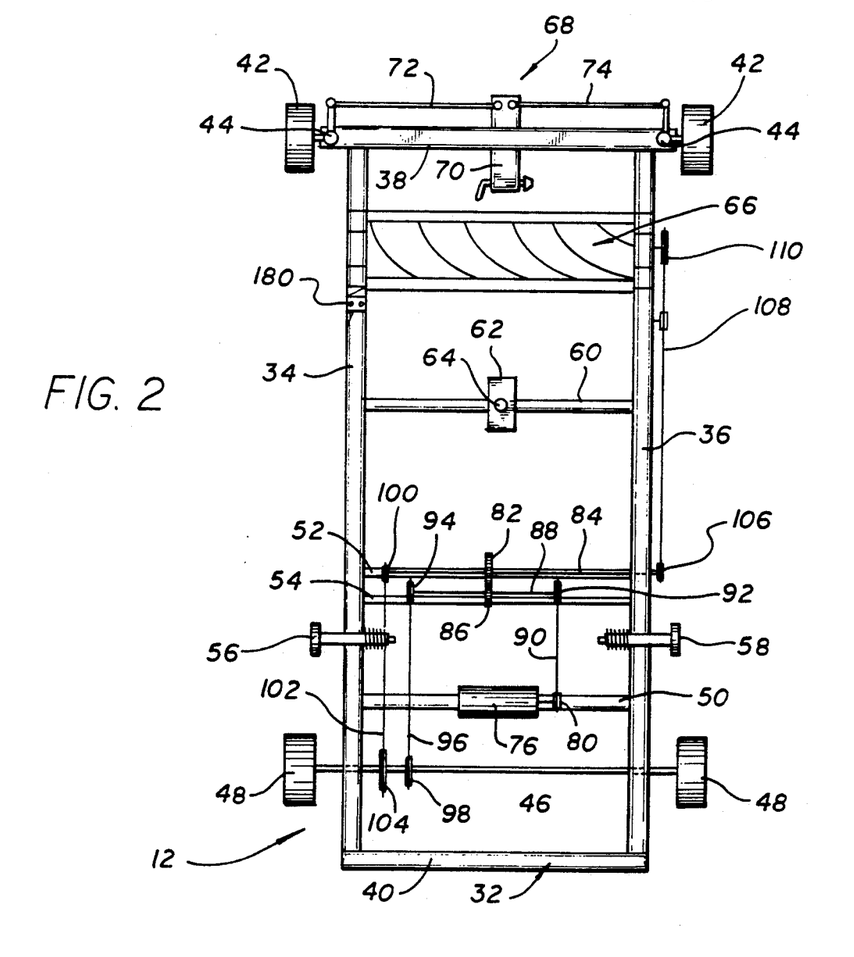
FIG. 2 is a top view of the bicycle powered lawn mower shown in FIG. 1.
Figure 3:
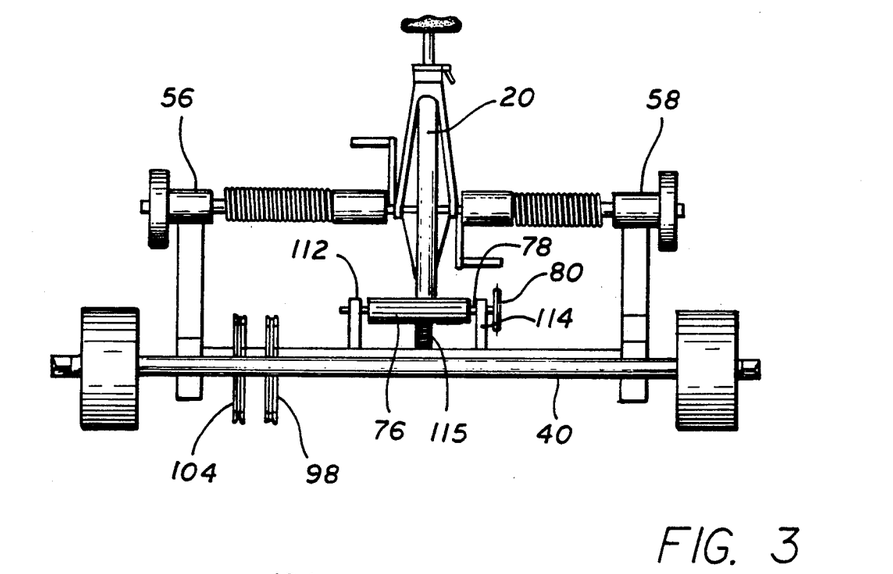
FIG. 3 is a rear view of the bicycle powered lawn mower shown in FIG. 1.

Referring to the drawings, and particularly FIGS. 1, 2 and 3, there is shown a bicycle powered lawn mower 10 comprising a main mower frame 12 to which a bicycle 14 can be releasably attached. The bicycle 14 comprises a bicycle frame 16, a front wheel fork 18, a rear wheel 20, saddle 22, and steering bar 24. Conventional means of propulsion are provided in the form of pedal sprocket 26, rear wheel sprocket 28, and chain 30. Other features, such as brakes, gears and the like, may also be included in the bicycle but for convenience are not described or shown in the present drawings.

The mower frame 12 of the bicycle powered lawn mower 10 comprises a substantially rectangular frame 32 having a pair of substantially parallel side beams 34 and 36, a front beam 38 and a rear beam 40. The front beam 38 constitutes a mount to which front wheels 42 are connected at pivot 44. Spaced a short distance from the rear beam 40, there is provided a rear axle 46 and a rear wheel 48 is mounted on each side of the main frame 12 at each end of the rear axle.

A main drive roller bar 50 is fixed between side beams 34 and 36. A first mesh gear bar 52 and a second mesh gear bar 54 are also located between the side beams 34 and 36 forwardly of the main drive roller bar 50. A pair of bicycle rear axle supports 56 and 58 are mounted on side beams 34 and 36 respectively, the bicycle rear axle supports being adapted to receive and firmly hold the rear axle 28 and sprocket 29 of the bicycle. This is best seen in FIGS. 1 and 3 of the drawings.

A bracket support bar 60 extends between side beams 34 and 36 forwardly of the first mesh gear bar 52. The bracket support bar has located at approximately its mid-point a bracket 62, the bracket 62 having a ball pivot 64. The ball pivot 64 is adapted to receive and support the bicycle frame 16 as can be clearly seen in FIG. 1 of the drawings.

Towards the front of the mower frame 12, there is mounted a mower blade assembly 66, which can be raised and lowered. The mower blade assembly 66, as well as its driving mechanism and raising/lowering mechanism, is described in further detail below.

A steering system 68 is provided for steering the front wheels 42. The steering system 68 includes a steering beam 70 adapted to be fixed at its one end to the front wheel fork 18 of the bicycle. At its other end, the steering beam 70 has a pair of steering bars 72 and 74 extending to each of the front wheels 42 respectively. In a conventional manner which will not be described herein, adjustment of the steering beam 70 results in concomitant movement of the steering bars 72 and 74, which, through the various pivot connections steer the front wheels. The present invention may, however, use any other steering mechanism which may be convenient.

A main drive roller 76 is mounted on the main drive roller bar 50. When mounted on the mower frame 12, the rear wheel 20 of the bicycle is in contact with the main drive roller 76, best illustrated in FIG. 1 of the drawings. The bicycle rear axle supports 56 and 58 are fixed to the rear wheel axle 28 of the bicycle in such a way as to insure that the rear wheel is firmly in contact with the main drive roller 76. The main drive roller 76, when rotated, drives a shaft 78 and sprocket 80.

The first mesh gear bar 52 has mounted thereon a first mesh gear 82 and a shaft 84. The second mesh gear bar 54 has mounted thereon a second mesh gear 86 and a shaft 88. The first mesh gear 82 and second mesh gear 86 are of a size and spaced from each other such that they are permanently engaged.

The main drive roller 76 drives shaft 78 and sprocket 80. A chain 90 extends between the sprocket 80 and a sprocket 92 on the shaft 88. At the other end of the shaft 88, there is a sprocket 94, and a chain 96 extends from the sprocket 94 to a reverse drive sprocket 98 mounted on the rear axle 46 in a manner to be described below. It is to be noted that the second mesh gear 86 is fixedly mounted on the shaft 88 so that when the shaft 88 is turned by the sprocket and chain assembly (80, 92 and 90), the second mesh gear 86 rotates and, since it engages with the first mesh gear 82, rotates the first mesh gear 82 in a direction opposite to that of second mesh gear 86.

The first mesh gear 82, when rotating, rotates the shaft 84. At one end of the shaft 84 there is mounted a sprocket 100. A chain 102 extends from the sprocket 100 to a forward drive sprocket 104 mounted on the rear axle 46 in a manner to be described below.

The other end of the shaft 84 includes a sprocket 106, and a mower belt chain drive 108 extends from the sprocket 106 to the mower sprocket 110. In this way, the rear wheel of the bicycle, in a manner to be described below, is capable of driving the mower blade assembly 66.

The main drive roller 76 is mounted on the main drive roller bar 50 in a manner which insures proper contact with the rear wheel 20 of the bicycle. Extending upwardly from the main drive roller bar 50 are a pair of upstanding supports 112 and 114 between which the main drive roller 76 is supported. A pressure spring 115 is located between the main drive roller bar 50 and the lower part of the main drive roller which urges the main drive roller 76 upwardly or towards the rear wheel 20 of the bicycle. In this way, a positive engagement between the main drive roller 76 and the rear wheel of the bicycle 20 is facilitated. Further, the main drive roller 76 is constructed or layered with a material which maximizes traction between the rear bicycle tire and the roller so that slippage is reduced as much as possible. In this way, the maximum amount of energy delivered from the rear wheel 20 of the bicycle is transmitted to the main drive roller 76 and the driving assembly on the mower frame 12.

The mower blade assembly 66 will now be described with particular reference to FIG. 6 of the drawings. The assembly 66 comprises a rotary blade drum 116 having a series of angled blades 118 attached thereto. Rotation of the blade 116 over a lawn surface causes the lawn to be cut in conventional manner. The blade drum 116 is mounted to the side beams 34 and 36 of the mower frame 12 by means of a support bracket 120. The support bracket comprises an upper portion 122 and a lower portion 124 at an angle thereto, the blade drum 116 being pivotally mounted on the lower portion 124 of the support bracket 120. The upper portion 122 includes a cylindrical sleeve assembly 126 and a spring 128, which insure that the belt tension is maintained, and that the proper cutting height is achieved when the blade drum 116 is lowered as described below. A fixed blade 130 is mounted on a bracket 132, and cooperates with blades 118 to cut the lawn. The bracket 132 is mounted in a slot 134 of a descending arm 136 on the frame 34 and is held in the slot by bolt assembly 138 which slides in the slot permitting the mower assembly 66 to be raised and lowered. The bracket 132 also supports a roller 140 which moves over the surface thereby insuring proper height adjustment of the blades with respect to the grass.

The blade drum 116 has a mower sprocket 110. A mower belt drive 108 extends between the sprocket 110 and the sprocket 106 mounted at the end of the shaft 84. Rotation of the first mesh gear 82 causes rotation of the shaft 84, whereby the sprocket 106 is rotated to drive the mower belt drive 108 and ultimately the blade drum 116.

Figures 4, 5:
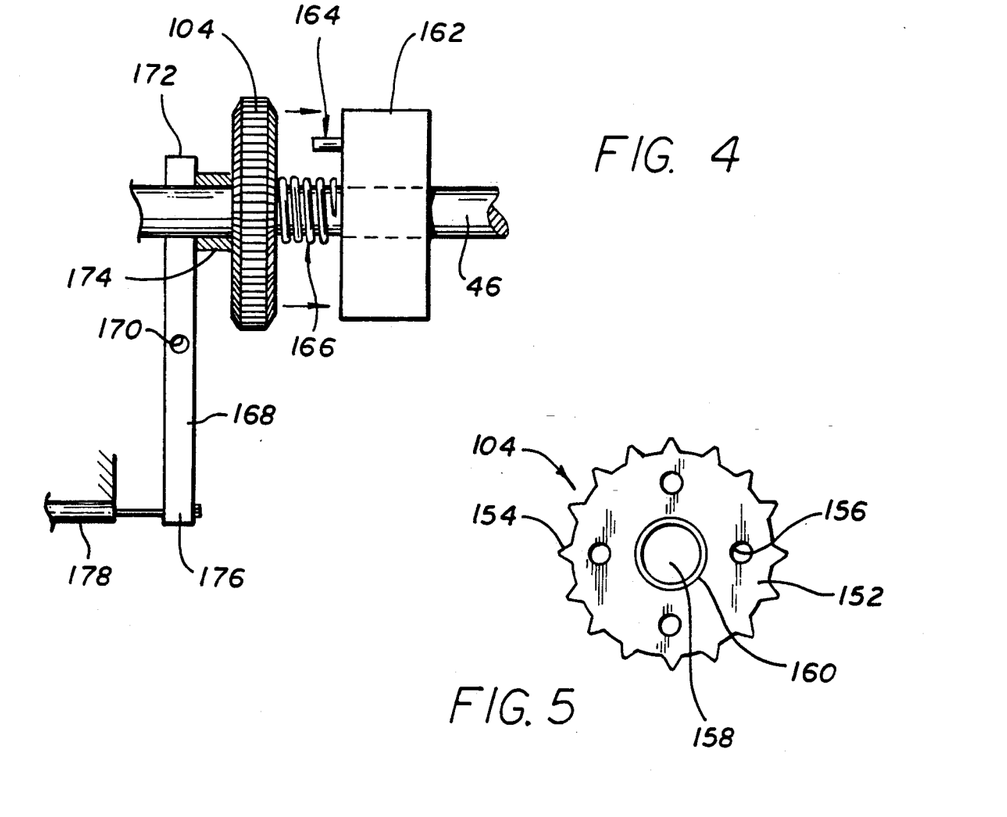
FIG. 4 is a top view of the clutch mechanism in the bicycle powered lawn mower.
FIG. 5 is a side view of the drive sprocket shown in FIG. 4 of the drawings.

The support bracket 120 is fixed to the frame 34 such that the height of blade drum 116 can be set and fixed. A bracket 146 having a slot 148 is attached to the upper portion 122, and also to the frame 34. A bolt 150 extends through the slot 148, and when the blade drum 116 is at the desired height, having been adjusted by upward or downward movement of the upper portion 132 and bracket 146, the bracket 146 is fixed relative to the frame 34 by tightening the bolt 150. Reference is now made to FIGS. 4 and 5 of the drawings, showing the drive sprocket and clutch mechanism as described above. A reverse drive sprocket 98 and a forward drive sprocket 104 are mounted on the rear axle 46. Since each drive sprocket 98 and 104 respectively causes the axle to rotate in a different direction, a clutch mechanism is provided whereby the operator can select either the reverse drive sprocket or the forward drive sprocket to drive the axle, with the other sprocket being disconnected. The following describes the forward drive sprocket 104 but the identical structure pertains with respect to the reverse drive sprocket 98.

The forward drive sprocket 104 comprises a circular disk portion 152 having at its periphery a plurality of radially outwardly projecting teeth 154. The disk portion 152 has equispaced therein four or more drive pin holes 156, a bore 158 at the center of the sprocket 104 and a bearing 160 located therein. The chain 102 engages the teeth 154 of the sprocket 104 in conventional manner.

The sprocket 104 is mounted on the rear axle 46 such that the axle passes through the bore 158. The sprocket 104 is free to slide along the axle 46 and rotates freely thereon. Adjacent the sprocket 104 is a fixed member 162 fixed to the axle 46. A drive pin 164 extends outwardly from the fixed member 162 and is the same distance from the outer periphery of the rear axle 46 as are the pin holes 156 in the drive sprocket 104. A spring 166 is located between the drive sprocket 104 and fixed member 162, and, under normal circumstances, urges the drive sprocket 104 away from the fixed member 162. When the drive sprocket is not engaged with the fixed member, with the drive pin 164 located in a pin hole 156, it rotates free about the axle 46.

An engage lever 168 is provided whereby the drive sprocket 104 can be brought into engagement with the fixed member 162. The engage lever 168 is pivotally mounted at pivot point 170. One end 172 of the engage lever 168 abuts a throw-out bearing 174, while the other end 176 is fixed to a cable 178. The cable extends along the mower frame 12, and connects to a control lever 180 located within easy access of the operator. Movement of the control level pivots the engage lever 168 through the action of the cable 178 and brings the drive sprocket 104 into engagement with the fixed member 162. When the control lever 180 is released, the engage lever 168 moves back to the position shown in FIG. 4 of the drawings and the action of the spring 166 urges the drive sprocket away from the fixed member 162, thus disengaging the drive sprocket 104 and fixed member 162. In this position, the drive sprocket 104 moves freely about the axle 46 without rotating it, while in the engaged position with the fixed member 162, rotation of the drive sprocket 104 causes rotation of the axle 46. A similar structure and operation prevails with respect to the reverse drive sprocket 98, the description of which will not be repeated.

OPERATION

The front wheel of a bicycle is removed and the front wheel fork 18 of the bicycle is fixed to the steering beem 70. The bicycle frame 16 is positioned such that it rests on the ball pivot 64 of bracket 62 while the rear wheel 20 rests on the main drive roller 76. As mentioned above, the main drive roller 76 is urged upwardly by the action of the spring 115 to insure a solid traction between the tire of the rear wheel 20 and the main drive roller 76. The bicycle lawn mower is now ready for use, and peddling the bicycle sets the apparatus in motion.

The rotation of the rear wheel 20 causes the main drive roller 76 to rotate in the direction indicated by arrow A in FIG. 1. The main drive roller 76 drives shaft 78 and sprocket 80. A chain 90 extending between sprocket 80 and sprocket 92 causes rotation of the shaft 88 and the second mesh gear 86. The second mesh gear rotates in the direction shown by arrow B in FIG. 1 of the drawings. Rotation of the shaft 88 causes rotation of sprocket 94 and the chain 96, which extends between the sprocket 94 and the reverse drive sprocket 98 on the rear axle 46, causes rotation of the reverse drive sprocket 98. The reverse drive sprocket 98, when not engaged with its corresponding fixed member will simply rotate freely about the axle 46 and do no work. When the reverse drive sprocket 98 engages with its fixed member, it will cause the reverse drive sprocket 98 to rotate in the direction indicated by arrow C of the drawings, and the rear axle 46 and rear wheels will rotate in the same direction which results in the bicycle powered lawn mower moving in the reverse direction.

The first mesh gear 82, by virtue of its engagement with the second mesh gear 86, is caused to rotate. Rotation of the first mesh gear 82 cause the shaft 84 to rotate as well as the sprocket 100. The chain 102 between the sprocket 100 and the forward drive sprocket 104 causes the forward drive sprocket 104 to rotate in the opposite direction to that of the reverse drive sprocket 98. Thus, when the forward drive sprocket is engaged with the fixed member 162 the rear wheels 48 will be caused to rotate and move the bicycle powered in the forward direction.

The shaft 84, rotated by the first mesh gear 82, also rotates sprocket 106. The mower belt drive 108 drives the mower sprocket 110 which in turn drives the rotor blade wheel 116.

Figure 6:
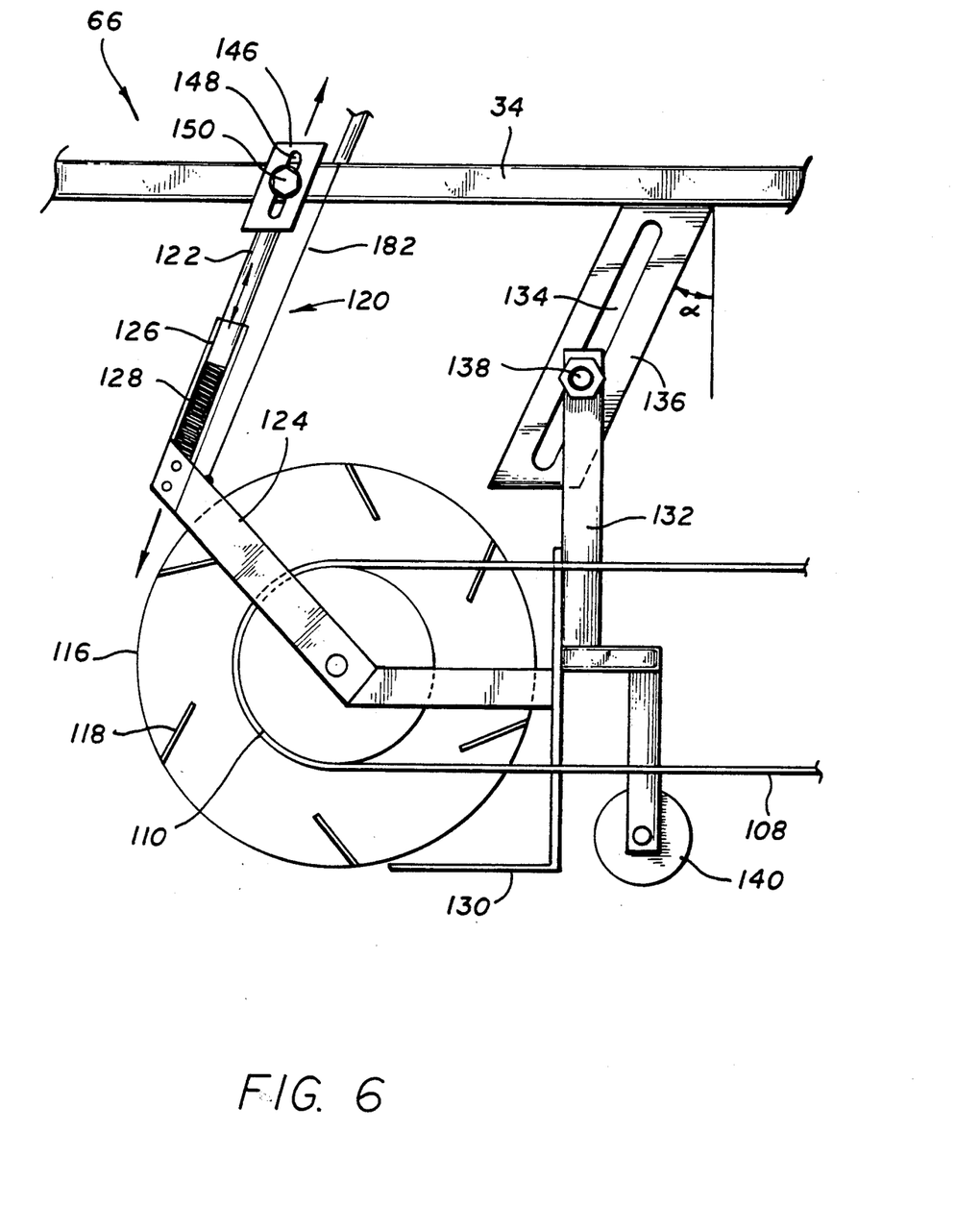
FIG. 6 is a detailed side view showing the mower blade attachment.

When it is desired to move the bicycle powered lawn mower over a surface where no cutting is required, the mower blade assembly 66 can be raised by means of a lift cable 182 (see FIG. 6). The lift cable 182 may be mounted on the control lever 180 so that it is within easy reach of the operator. At the same time, the mower blade assembly is raised, the chain drive system is disengaged from the fixed member 162. Another blade drive assembly would utilize the following setup. When the blade drum 116 is in the raised position, the belt tension becomes slackened due to reduced linear center to center distance between the drive pulley 110 and the sprocket 106. In this way, the blade drum 116 will not be rotated and unnecessary energy not dissipated. When the blade 116 is lowered using the lift cable 182, the belt is tightened since the center to center distance is increased. Tightening of the belt engages the blade drum 116 which is therefore rotated. An idler pulley may be provided to retain the alignment of the belt 108 when slack. The idler pulley (not shown) may be located at any convenient point along the length of the lower belt drive 108.

Figure 7:
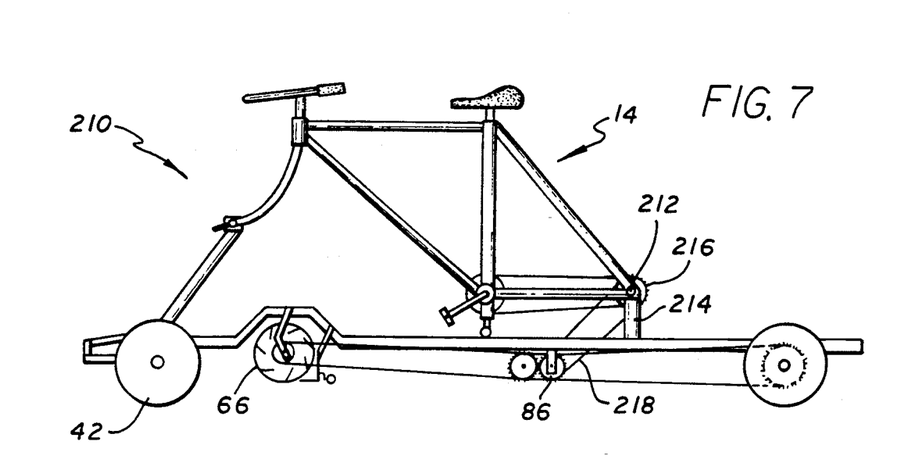
FIG. 7 is a side view of a second embodiment of a bicycle powered lawn mower of the invention.
Figure 8:
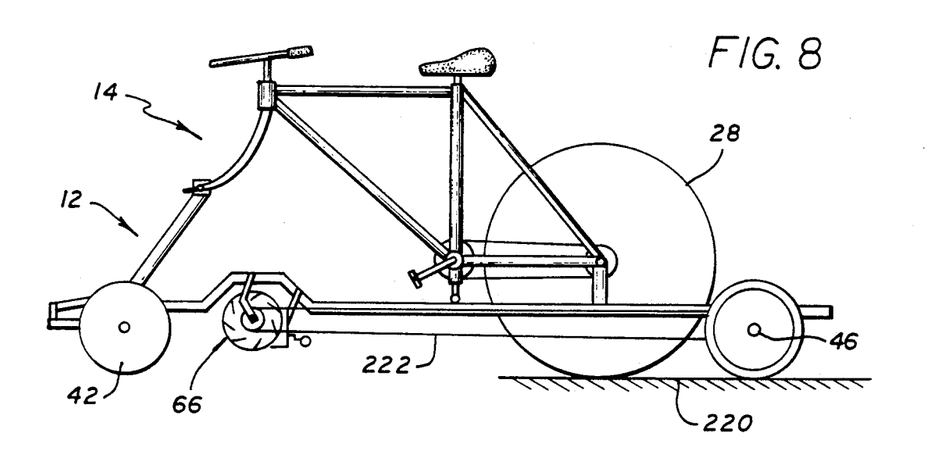
FIG. 8 is a third embodiment of a bicycle powered lawn mower of the invention.

With reference to FIG. 7, there is shown a second embodiment of the invention. A bicycle powered lawn mower 210 comprises features in most ways identical to that described in the previous embodiment, except that the rear wheel 20 of the bicycle has been removed. In this embodiment, the rear wheel axle 212 is mounted on a support 214, and the existing bicycle chain is engaged with a first mesh gear 216 and the second mesh gear 86 by means of a chain 218. In this embodiment, the main drive roller is eliminated, and the second mesh gear is driven directly through the chain linkage. In FIG. 8, it is to be noted that the rear wheel 28 of the bicycle is in contact with the ground 220 and that the mowing blade assembly 66 is driven by a chainbelt 222 which extends from the rear axle 46. In this way, the rear wheel of the bicycle directly drives the entire apparatus, and the various rollers, sprockets and chains are eliminated.

Figure 9:
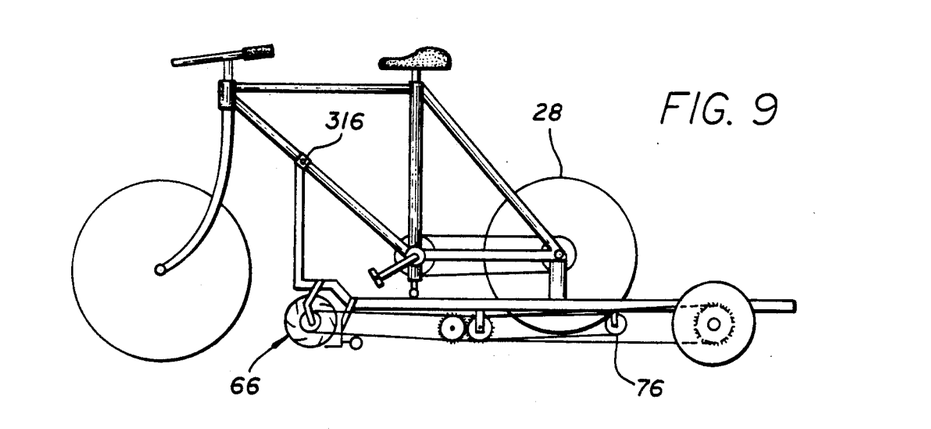
FIG. 9 is a fourth embodiment of the bicycle powered lawn mower of the invention.

In FIG. 9, yet a further embodiment of the invention is disclosed wherein both wheels remain on the bicycle. The front wheel is in direct contact with the ground, and steers the mower apparatus, while the rear wheel 28 contacts and drives a main drive roller 76, with associated transmission, as described above. The front portion of the mower frame is supported by connection to the bicycle frame 16 at point 316.

Figure 10:
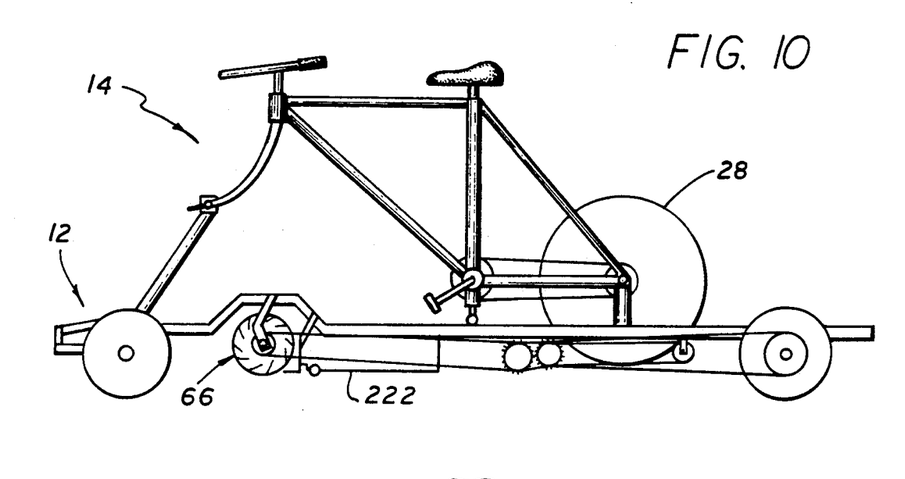
FIG. 10 is a fifth embodiment of the bicycle powered lawn mower including a grass catcher tray.

In FIG. 10, a bicycle powered lawn mower of the invention is shown which includes a grass catcher tray 222 which is releasably fixed to the mower frame 12. The tray 222 is located behind the bracket 132 so that grass blades cut by blade drum 116 and blade 118 move into the tray 222.

Figure 11:
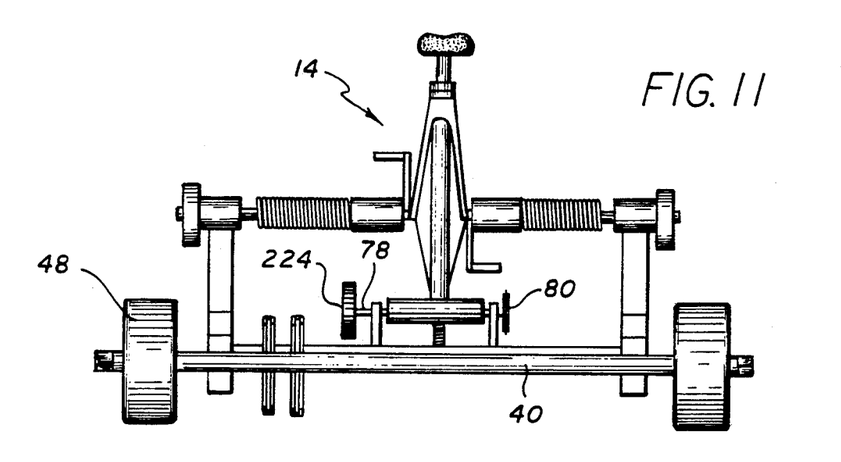
FIG. 11 is a sixth embodiment of the bicycle powered lawn mower including an inertia flywheel.

With reference to FIG. 11 of the drawings, a bicycle powered lawn mower of the invention includes an inertia flywheel 224 located on the shaft 78 of the main drive roller 76. The inertia flywheel 224 smooths out pedaling and facilitates the smooth movement of the mower.

Figure 12:
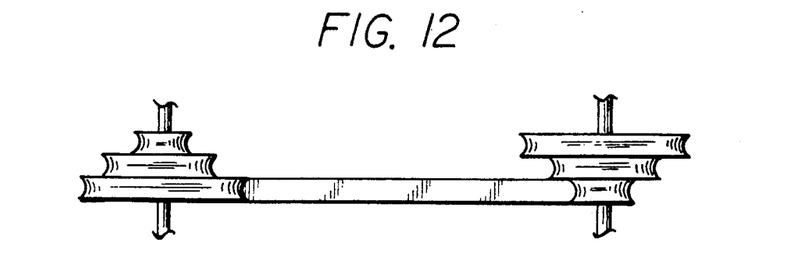
FIG. 12 is a seventh embodiment showing multiple size sheaves on the mower blade drive to optimize rotational blade speed.

In FIG. 12 of the drawings, there is shown multiple size sheaves which may be used on the mower blade drive system to optimize the rotational blade speed with respect to ground cover. The operator may therefore select the most convenient ratio so that the blades will rotate at a speed most suitable in the circumstances.

The invention is not limited to the precise constructional details described above or illustrated in the drawings. For example, instead of using gear sprockets and chains, a belt in each instance may be used which moves over a sheave or pulley wheel.

I claim:
1. A bicycle powered mower comprising:
   a mower frame, the frame being substantially rectangular and having a pair of front wheels;
   a pair of rear wheels mounted on an axle near the rear of the mower frame;
   bicycle support means on the mower frame for releasably receiving a bicycle having a frame, front wheel, rear wheel, and front fork;
   drive means for driving the mower frame over a surface; and
   a cutter blade assembly operatively connected to the drive means for selectively activating the cutter blade assembly.

2. A mower frame as claimed in claim 1 wherein the front wheels are operated by a steering mechanism to permit steering of the mower frame.

3. A mower as claimed in claim 2 wherein the steering mechanism includes a bracket for connection to the front fork of a bicycle so that the front wheels can be steered by steering the 4. A mower as claimed in claim 1 wherein the bicycle support means comprises a ball pivot support bracket for supporting the frame of the bicycle and a steering support bracket for connection to the front fork of the bicycle.

5. A mower as claimed in claim 1 wherein the drive assembly comprises: a main drive roller for supporting and remaining in fixed contact with the rear wheel of the bicycle; and a transmission assembly between the main drive roller and the rear wheels for transmitting motive force from the main drive roller to the rear wheels to drive the mower frame.

6. A mower as claimed in claim 5 wherein the transmission assembly comprises a first gear train between the drive roller and the rear wheels to drive the mower frame in a reverse direction and a second gear train between the drive roller and the rear wheels to drive the mower frame in a forward direction.

7. A mower as claimed in claim 6 wherein the first and second gear trains include first and second drive sprockets respectively, each drive sprocket being mounted on the rear wheel axle.

8. A mower as claimed in claim 7 wherein each drive sprocket has associated connecting means fixed to the axle to which the drive sprocket can be releasably connected, the drive sprocket being movable between a first position wherein the sprocket is connected to its associated connecting means and thereby rotates the axle when driven, and a second position wherein the drive sprocket is disconnected from its associated connected means and, when rotated, rotates freely about the axle, the drive sprocket being normally biased into the second position.

9. A mower as claimed in claim 8 wherein the connecting means comprises a fixed member attached to the rear axle, a drive pin extending outwardly from the fixed member and a drive pin receiving hole in the drive sprocket for receiving the drive pin when the drive sprocket is in the first position.

10. A mower as claimed in claim 9 further comprising control means for moving the drive sprocket between the first and second positions, the control means including a pivotal lever one end of which is adjacent the drive sprocket, the other end of which can be operated to move the drive sprocket between the first and second positions.

11. A mower as claimed in claim 6 wherein the first gear train comprises a series of sprockets and chains between the drive roller and the rear axle, and the second gear train comprises a series of sprockets and chains between the first gear train and the rear axle.

12. A mower as claimed in claim 5 further comprising an inertia flywheel connected to the main drive roller.

13. A mower as claimed in claim 1 wherein the cutter blade assembly comprises a rotatable blade member mounted to the frame by a bracket, a fixed blade and height adjustment means.

14. A mower as claimed in claim 13 wherein the drive means comprises a belt chain extending between the blade member and the drive means.

15. A mower as claimed in claim 14 wherein the cutter assembly further comprises a lift cable whereby the blade member can be raised and lowered, wherein raising the blade member reduces the distance between the blade member and the drive means and causes slack in the belt.

16. A mower as claimed in claim 1 wherein the drive means comprises a first gear train connected to a sprocket mounted on a support axle and to the rear axle, and a second gear train connected to the first gear train and the cutter blade assembly.

17. A mower as claimed in claim 1 wherein the drive means comprises the rear wheel of the bicycle in contact with the surface while the cutter blade assembly is driven by a belt connected to the rear axle.

18. A mower as claimed in claim 1 wherein the front wheel of the bicycle is in contact with the surface and is used for steering the mower.

19. A mower as claimed in claim 1 further comprising a grass catch tray arranged with respect to the cutter blade assembly such that cut grass is tossed into the tray.

* * * * *